United States Patent [19]

Vautrain

[11] 4,033,727
[45] July 5, 1977

[54] SEPARATOR RING IN FIXED BED RADIAL FLOW CATALYTIC REACTOR

[75] Inventor: Lucien H. Vautrain, Sweeny, Tex.

[73] Assignee: Phillips Petroleum Company, Bartlesville, Okla.

[22] Filed: July 6, 1976

[21] Appl. No.: 703,027

[52] U.S. Cl. ............................... 23/288 R; 208/146
[51] Int. Cl.² ...................... B01J 8/02; C10G 35/04
[58] Field of Search ......... 23/288 R, 288 B, 288 H, 23/288 J, 288 K, 288 L; 208/134, 146

[56] References Cited

UNITED STATES PATENTS

| | | |
|---|---|---|
| 3,167,399 | 1/1965 | Hansen, Jr. .................... 23/288 R |
| 3,249,405 | 5/1966 | Waddill .......................... 23/288 R |
| 3,898,049 | 8/1975 | Burroughs et al. ............. 23/288 R |

Primary Examiner—Joseph Scovronek
Assistant Examiner—Roger F. Phillips

[57] ABSTRACT

A generally ring-like baffle is located in the bottom of a radial flow catalytic reactor around the central apertured product removal conduit. The annular space between the removal conduit and the baffle is partially filled with solid catalyst support. Above the catalyst support is the catalyst. This prevents feedstock from either bypassing the catalyst completely in the area adjacent the bottom of the reactor or forming hot spots as a result of the normally low rate of flow travel in this section of the reactor.

6 Claims, 4 Drawing Figures

SEPARATOR RING IN FIXED BED RADIAL FLOW CATALYTIC REACTOR

BACKGROUND OF THE INVENTION

This invention relates to radical flow catalytic reactors.

Radial flow catalytic reactors have been used for years in reforming applications. In these reactors feed is passed down an annular space adjacent the outer periphery thereof and flows radially inwardly through the catalyst and into a central apertured product removal conduit. Generally the catalyst rests on a solid support of some sort or on the bottom of the reactor. Since the feed material flows downwardly through the annulus and divides radially and goes through the catalyst radially, there is not a great amount of feed material to flow in the lower zone and long contact time with catalyst can occur with "runaway" temperatures resulting. If a granular support is used, the feedstock in this area can go down through the catalyst support bed and radially inwardly to the withdrawal conduit and thus not contact the catalyst to any appreciable extent with the result that there is little or no conversion of the material.

SUMMARY OF THE INVENTION

It is an object of this invention to eliminate hot spots in a radial flow catalytic reactor without harming overall efficiency;

It is yet a further object of this invention to avoid part of the feedstock from bypassing catalyst entirely in a radial flow fixed bed catalytic reactor.

In accordance with this invention a generally ring-like baffle is located in the bottom of the reactor around the central apertured product removal conduit and the annular space between this baffle and product removal conduit is partially filled with solid catalyst support on which the catalyst rests.

BRIEF DESCRIPTION OF THE DRAWINGS

In the drawings, forming a part hereof, wherein like reference characters denote like parts in the various views.

DESCRIPTION OF THE PREFERRED EMBODIMENTS

A radial flow reactor of the type to which this invention is applicable is described in Hansen, Jr. U.S. Pat. No. 3,167,399 (Jan. 26, 1965), the disclosure of which is hereby incorporated by reference. Such reactors can be utilized to upgrade low octane naphthas to high quality product suitable for use as motor fuels and the like. In particular these reactors are suitable for producing high yields of aromatic hydrocarbons from low aromatic naphtha cuts. The naphtha feedstocks generally will have a boiling point below 400° F. (204° C.).

Suitable catalysts for use in the reactor of this invention include halogen activated platinum on alumina catalysts which are well known in the art. One class of catalysts suitable for use in the reactor of this invention are described in Myers U.S. Pat. No. 3,449,264 (June 10, 1969), the disclosure of which is hereby incorporated by reference.

Figure 1:
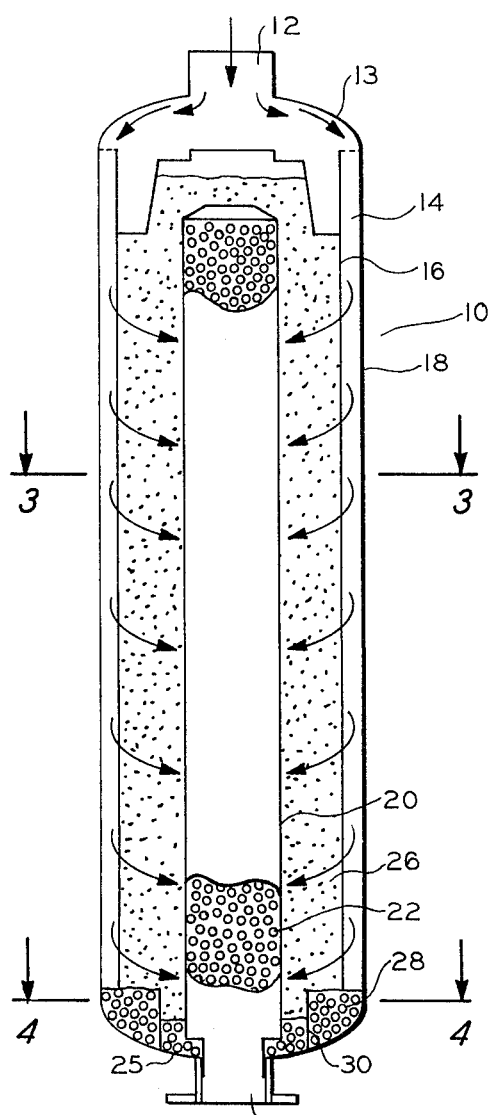
FIG. 1 is a side view partially in section of a radial flow fixed bed catalytic reactor utilizing the generally ring-like baffle of this invention.

Referring now to the drawings, particularly FIG. 1, there is shown a vertically disposed reactor vessel 10 having an inlet opening 12 in upper reactor wall 13. Feedstock introduced via opening 12 is diverted into annular space 14 formed between inner screen or perforated annular plate 16 and outer wall 18. Feedstock then flows radially inward from annulus 14 to central withdrawal conduit 20, entering the central withdrawal conduit via apertures 22. A screen 23 (see FIG. 2) may also be placed around central withdrawal conduit 20 to keep catalyst from being lost through apertures 22. Product is then withdrawn via outlet opening 24 in lower reactor wall 25. Catalyst bed 26 rests on catalyst support 28. Catalyst support 28 is not all at the same level, however, but rather separator ring 30 is provided so that catalyst support in the annulus surrounding the operator ring is at a level essentially coextensive with the top of the separator ring. Catalyst support in the annulus inside the separator ring is at a lower level, generally being at a level 0.1 to 0.8, preferably 0.25 to 0.75 times the height of ring 30.

Figure 2:
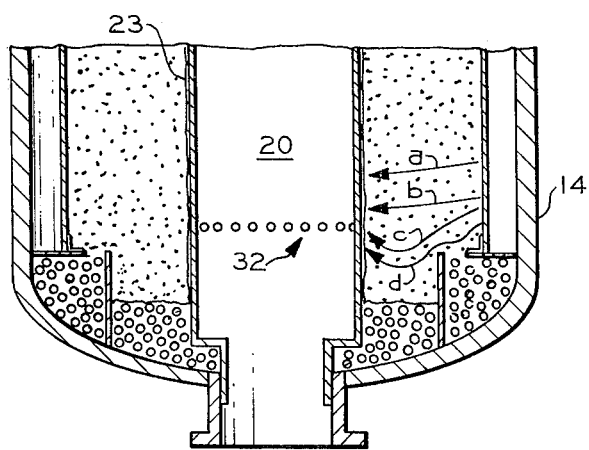
FIG. 2 is a detailed view in section of the lower portion of the reactor.

Thus feedstock as shown in FIG. 2 flows radially inward from annulus 14 to withdrawal conduit 20 as shown by arrows $a$ and $b$. Arrows $c$ and $d$ depict how separator ring 30 prevents feedstock at the very lower end of annulus 14 from bypassing the catalyst altogether. Separator ring 30 generally extends up from bottom wall 25 a distance equal to about 0.05 to 10, preferably 0.1 to 5 times the diameter of reactor 10, terminating at a level 0 to 3, preferably 1 to 2 inches below the last row 32 of apertures in central conduit 20.

Figure 3:
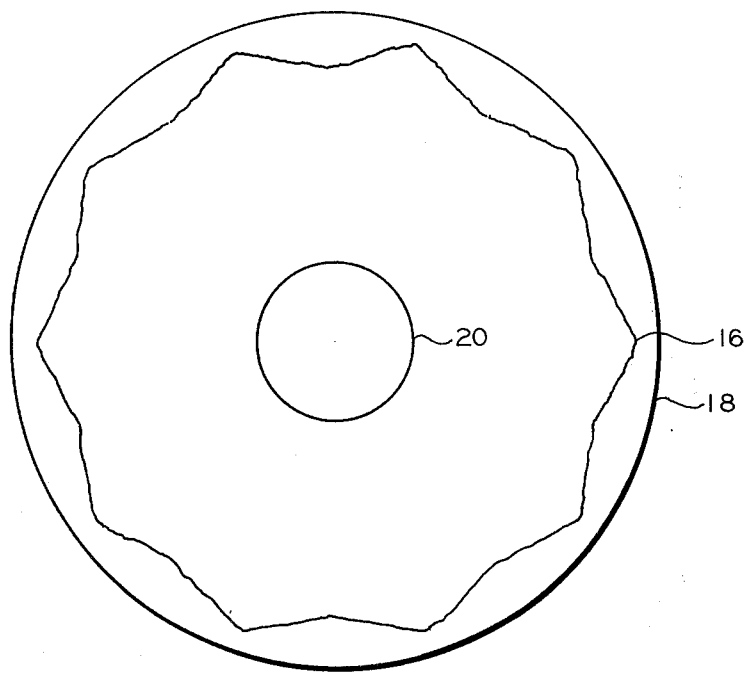
FIG. 3 is a section taken along line 3—3 of FIG. 1.
Figure 4:
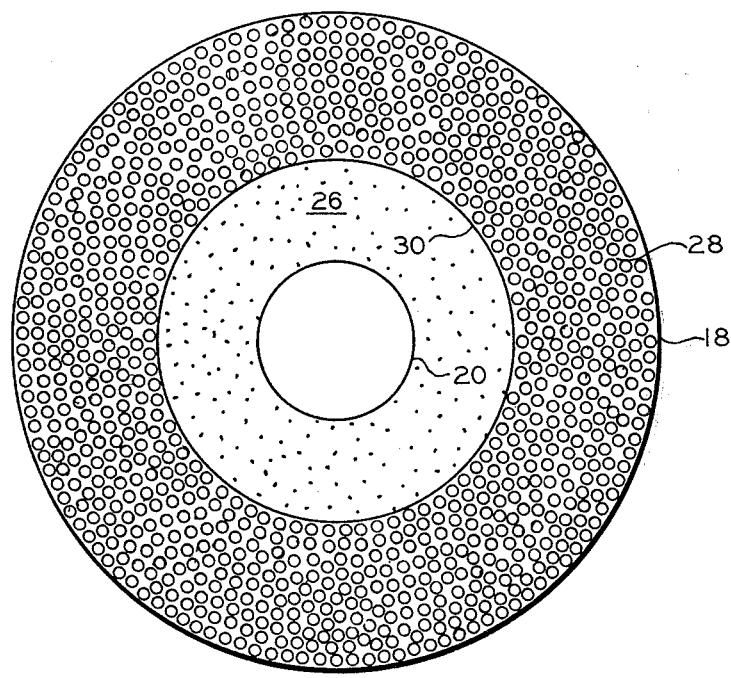
FIG. 4 is a section taken along line 4—4 of FIG. 1.

FIG. 3 simply shows a cross section of the reactor wherein screen or perforated annular means 16 has a scalloped configuration. Screen or perforated annular means 16 can also be cylindrical. FIG. 4 is a cross section through the area of the reactor having separator ring 30, and shows catalyst support material 28 in the annulus outside the ring and catalyst 26 inside the ring.

Catalyst support material 28 can be any conventional material used for supporting catalyst beds such as ceramic balls, crushed firebrick and the like.

EXAMPLE

The instant invention was utilized to modify an existing reforming plant utilizing three fixed bed catalytic reactors in series with heating between reactors wherein the catalyst rested upon a support of crushed firebrick. Feed was hydrogen and naphtha of low aromatic content and the yield reformate of high aromatic content. Typical operation of this plant as modified is set out hereinbelow:

|  | Reactor Number | | |
| --- | --- | --- | --- |
|  | 1 | 2 | 3 |
| Temperatures, ° F. | | | |
| Inlet | 904 (484° C.) | 909 (487° C.) | 901 (483° C.) |

-continued

| Outlet | 789 (421° C.) | 838 (448° C.) | 874 (468° C.) |
|---|---|---|---|
| Pressures, psig., | | | |
| Inlet | 476 (3280 KPa) | 476 (3280 KPa) | 449 (3094 KPa) |
| Outlet | 472 (3252 KPa) | 472 (3252 KPa) | 445 (3066 KPa) |
| Space Velocity, | | | |
| (Vol. of Charge/Hr/Vol. Cat) | 8.40 | 8.55 | 8.76 |
| Total Feed to Reactor 1: | | | |
| Recycle Hydrogen, MSCF/D | | 89,153 (2,523 MSCM/D) | |
| (92.6 mol % H$_2$) | | | |
| Naphtha Feed, B/D | | 16,315 ( 462 MSCM/D) | |
| (API at 60° F., 50.6) | | | |
| (Volume % Aromatics, 17.0) | | | |
| Total Feed from Reactor 3: | | | |
| Net Hydrogen, MSCF/D, | | 13,975 ( 395 MSCM/D) | |
| (92.6 mol % H$_2$) | | | |
| Recycle Hydrogen, MSCF/D, | | 89,153 (2,523 MSCM/D) | |
| (92.6 mol % H$_2$) | | | |
| Reformate*, B/D | | 15,540 (2,486 M$^3$/D) | |
| (Volume % Aromatics, 51.7) | | | |

*Includes 620 B/D (or 99 M$^3$) propane, isobutane, and normal butane.
MSCF/D means thousand standard cubic feet per day.
MSCM/D means thousand standard cubic meters per day.
B/D means barrels (42 gal/barrel) per day.
M$^3$/D means cubic meters (liquid) per day.

This plant has operated utilizing the invention for nine months with no problem with hot spots. On the average the plant has operated at an inlet reactor temperature of 15°–30° F. (8°–17° C.) lower than was required before modification to give the same aromatic content, and hence a specific octane rating. This is a major improvement and is attributed to the use of the separator ring to separate firebrick adjacent the outside wall at a level essentially coextensive with the top of the ring from firebrick inside the ring at a lower level as shown in the FIGURES herein.

While this invention has been described in detail for the purpose of illustration it is not to be construed as limited thereby but it is intended to cover all changes and modifications within the spirit and scope thereof.

What is claimed is:
1. In a vertically disposed reactor comprising:
   side walls, a top wall and a bottom wall;
   an inlet opening at an upper end thereof;
   an annulus communicating with said inlet opening, said annulus being formed by said side walls and a preforated means spaced inwardly from said side walls;
   a centrally disposed apertured withdrawal conduit having an outlet opening at a lower end thereof;
   the improvement comprising an annular separator ring extending upwardly from said bottom wall of said reactor between said side wall and said central apertured withdrawal conduit to a level within the range of 0 to 3 inches below a lowermost row of apertures in said central apertured withdrawal conduit, an annular space defined by said separator ring and said side wall being filled with catalyst support to a level essentially coextensive with a top of said separator ring and an annular space defined by said separator ring and said central apertured withdrawal conduit being partially filled with catalyst support, catalyst being present between said centrally disposed withdrawal conduit and said perforated means.
2. Apparatus according to claim 1 wherein said separtor ring extends to a level within the range of about 1 to 2 inches below said lowermost row of apertures in said central apertured withdrawal conduit.
3. An apparatus according to claim 2 wherein said annular separator ring extends up a distance of 0.1 to 0.5 times a diameter of said reactor.
4. In a vertically disposed reactor comprising:
   side walls, a top wall and a bottom wall;
   an inlet opening at an upper end thereof;
   an annulus communicating with said inlet opening, said annulus being formed by said side walls and a perforated means spaced inwardly from said side walls;
   a centrally disposed apertured withdrawal conduit having an outlet opening at a lower end thereof;
   the improvement comprising an annular separator ring extending upwardly from said bottom wall of said reactor between said side wall and said central apertured withdrawal conduit a distance within the range of 0.1 to 0.5 times a diameter of said reactor, an annular space defined by said separator ring and said side wall being filled with catalyst support to a level essentially coextensive with a top of said separator ring and an annular space defined by said separator ring and said central apertured withdrawal conduit being partially filled with catalyst support, catalyst being present between said centrally disposed withdrawal conduit and said perforated means.
5. An apparatus according to claim 4 wherein said annular separator ring extends up to a level within the range of 0 to 3 inches below a lowermost row of apertures in said central withdrawal conduit.
6. Apparatus according to claim 5 wherein said catalyst support is firebrick.

* * * * *